May 19, 1936.  J. F. RULE  2,041,517
MACHINE FOR BLOWING GLASS ARTICLES
Filed Sept. 11, 1933    6 Sheets-Sheet 1

Inventor
John F. Rule
By
Attorney

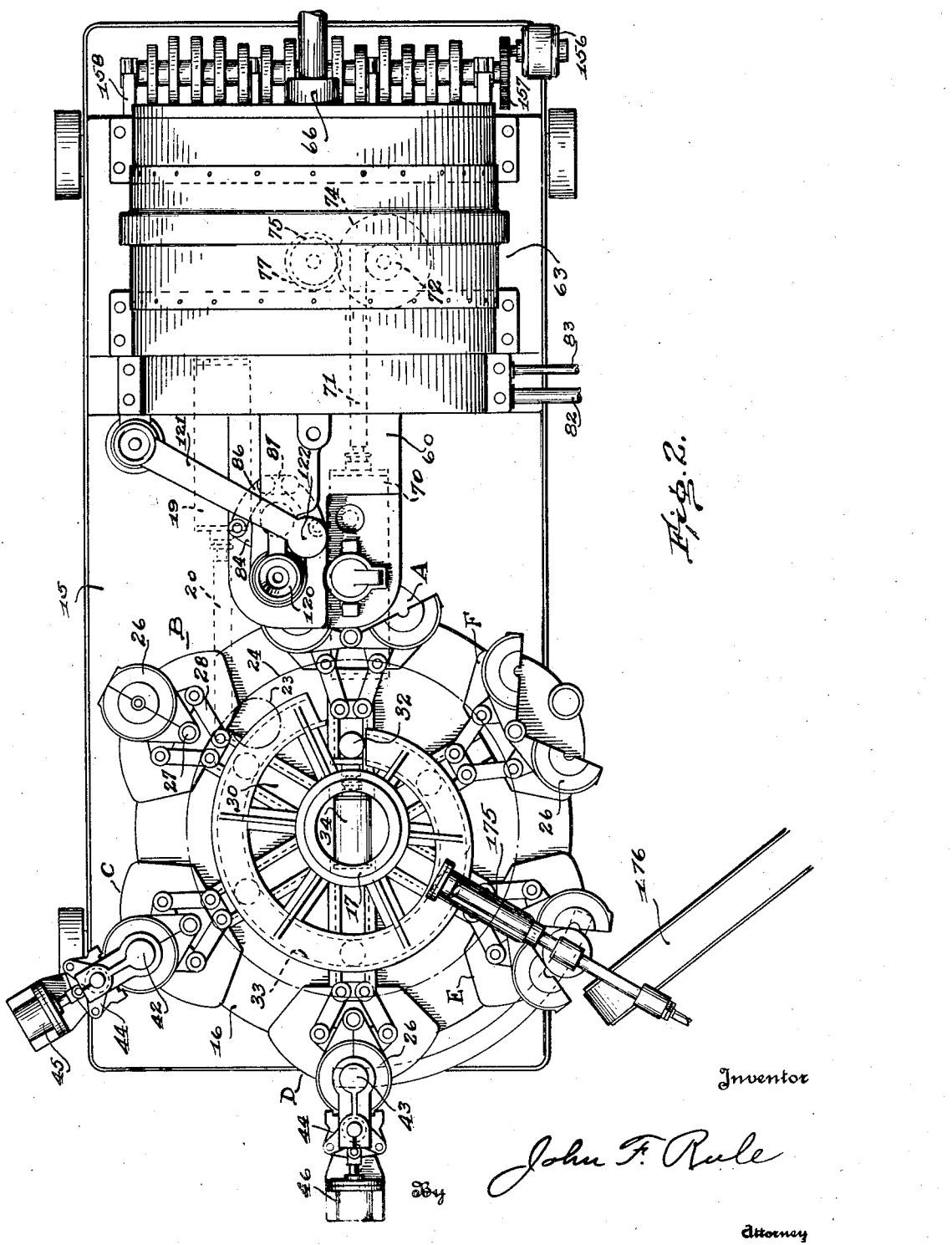

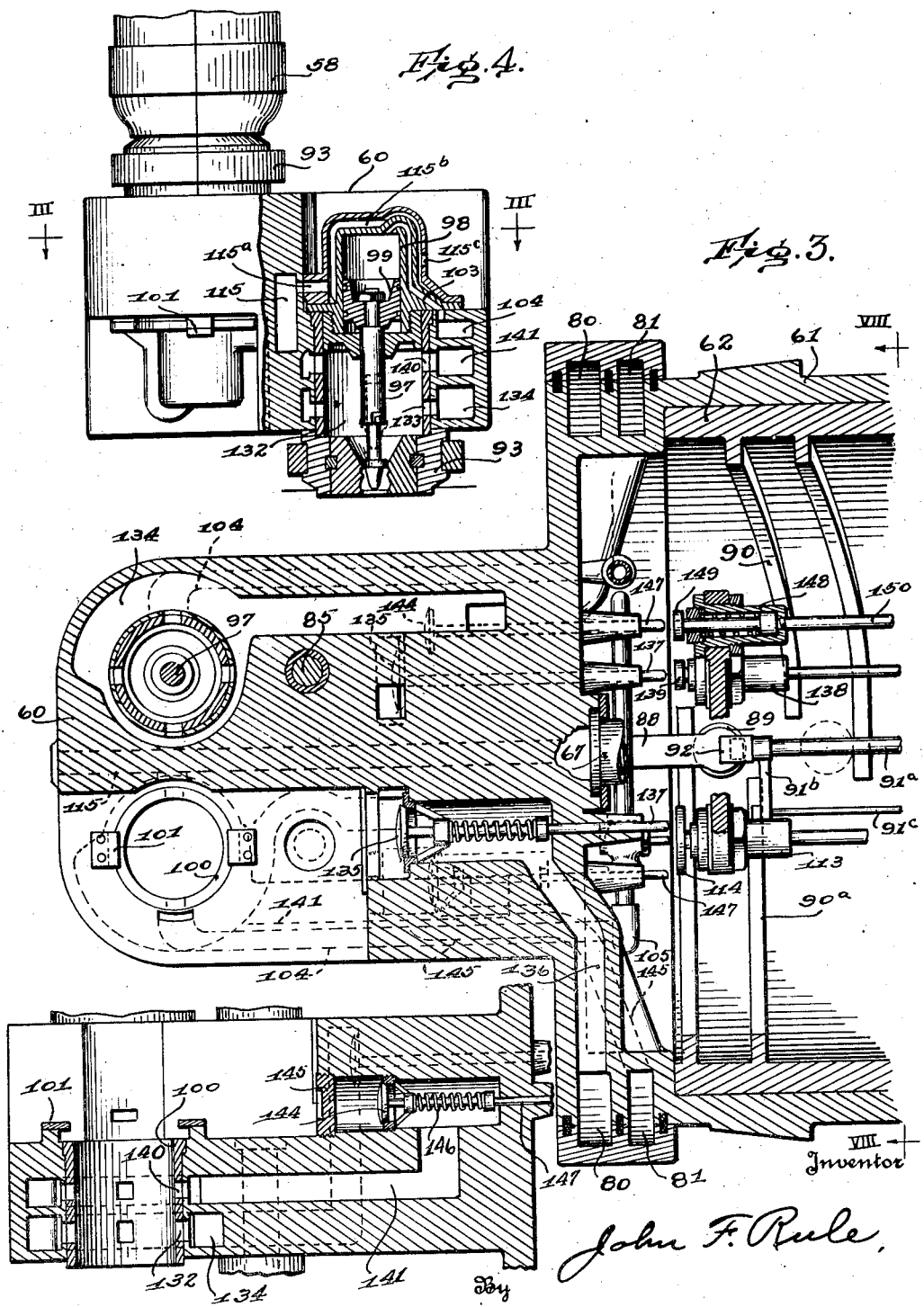

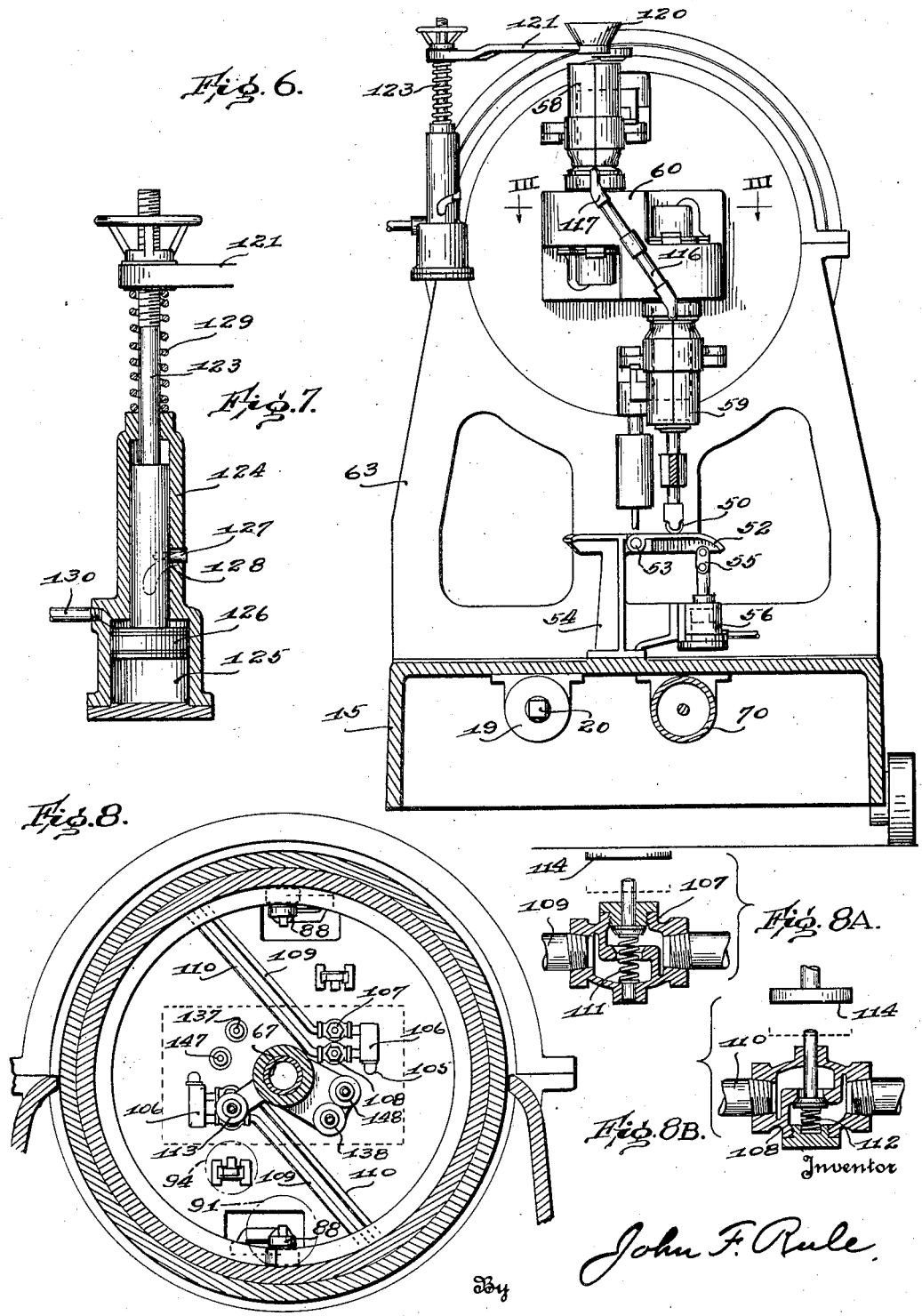

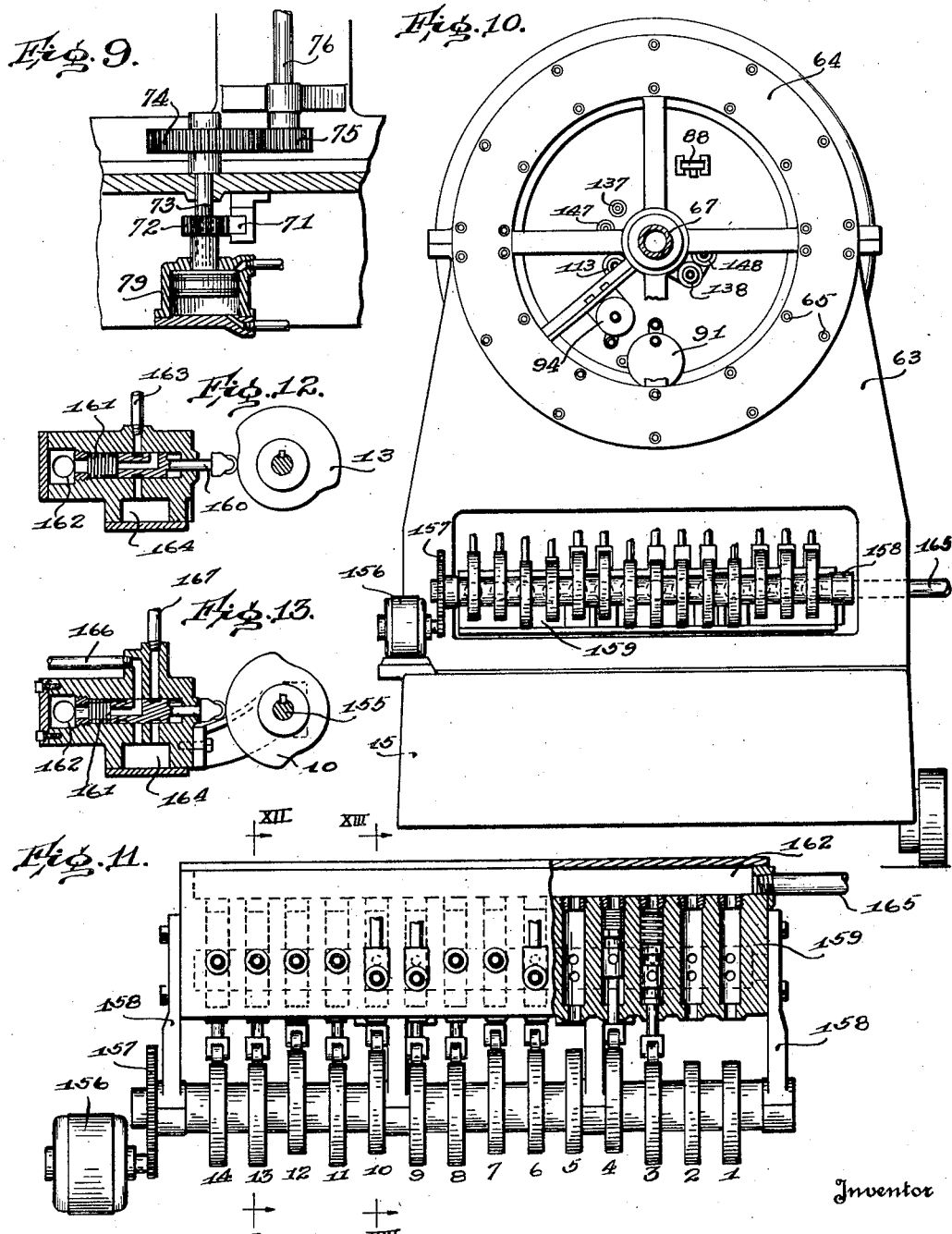

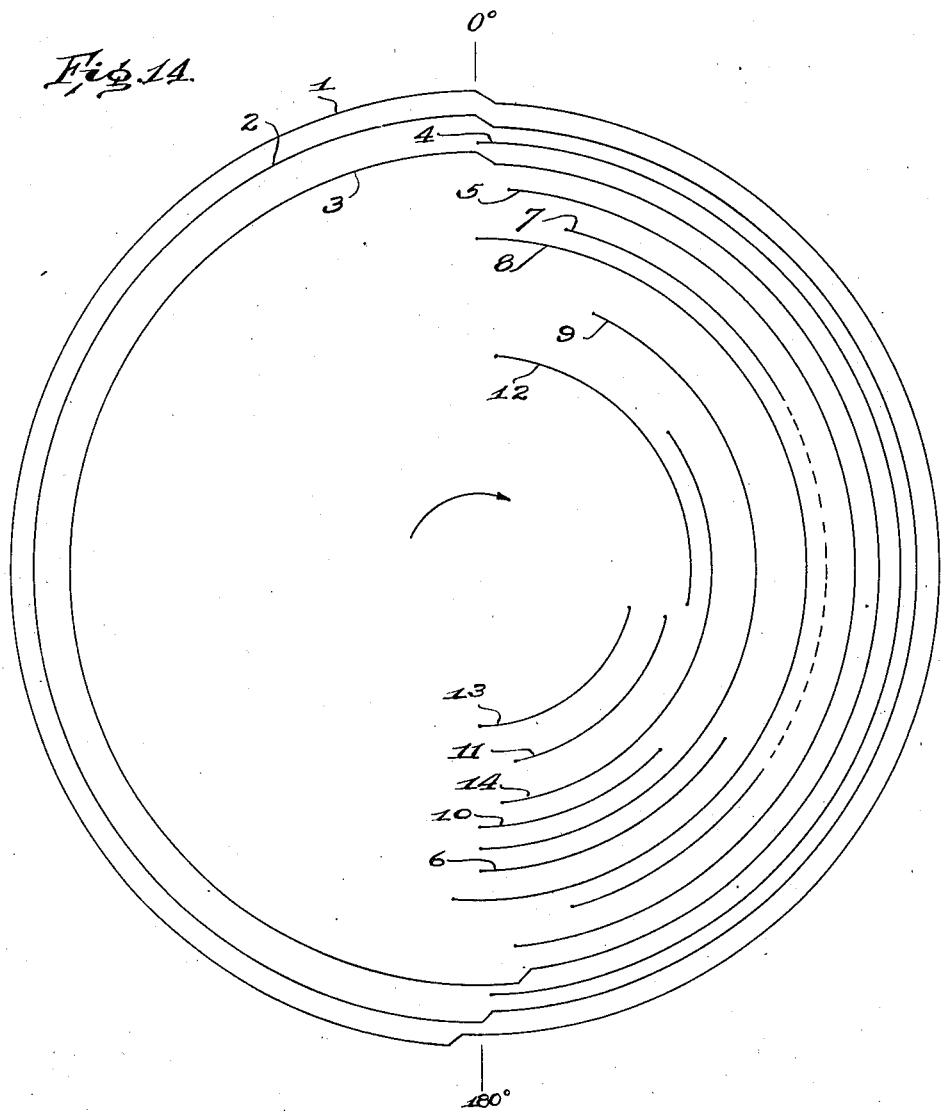

Patented May 19, 1936

2,041,517

UNITED STATES PATENT OFFICE 2,041,517

MACHINE FOR BLOWING GLASS ARTICLES

John F. Rule, Toledo, Ohio, assignor to Owens-Illinois Glass Company, a corporation of Ohio Application September 11, 1933, Serial No. 688,896

20 Claims. (Cl. 49—9)

My invention relates to machines for blowing hollow glass articles in molds. More particularly, it relates to a type of machine for blowing bottles, jars and the like, in which charges of molten glass are introduced into blank molds which give them a preliminary formation, the parisons thus formed being transferred to finishing molds, in which they are blown to their final form.

An object of the present invention is to provide a machine of simple and practical construction in which a pair of blank molds serve to supply parisons to a relatively large number of finishing molds. In accordance with my invention, one blank mold is in a charge receiving position while the other blank mold is at a transfer station, the arrangement permitting each blank mold to receive its charge or quota of glass while the other blank mold is at the transfer station where a parison is being transferred therefrom to a finishing mold.

Other objects of the invention will appear hereinafter.

In the accompanying drawings:

Fig. 2 is a plan view of the machine.

Fig. 3 is a fragmentary sectional plan on a larger scale, showing the blank mold inverting head and drum, the section being taken substantially at the lines III—III on Figs. 4 and 6.

Fig. 4 is a part sectional end elevation showing the blank mold inverting head.

Fig. 5 is a sectional side elevation of the inverting head.

Fig. 6 is a part sectional elevation of the machine, giving a view of the inner end of the inverting head and drum.

Fig. 7 is a fragmentary sectional elevation of the mechanism for operating the blank mold closing plate and funnel guide.

Fig. 8 is a cross-sectional view showing the drum which carries the inverting head, the section being taken at the line VIII—VIII on Fig. 3.

Figs. 8A and 8B are detail views showing respectively an air pressure valve and a vacuum valve controlling the plunger operations.

Fig. 9 is a fragmentary view of mechanism for rotating the blank mold inverting head.

Fig. 10 is an end elevation of the machine.

Fig. 11 is a part sectional plan view of the timing mechanism.

Figs. 12 and 13 are sections at the lines XII—XII and XIII—XIII, respectively, on Fig. 11.

Fig. 14 is a chart showing diagrammatically the timer cams and the time relation of the various operations under the control of said cams.

Figure 1:
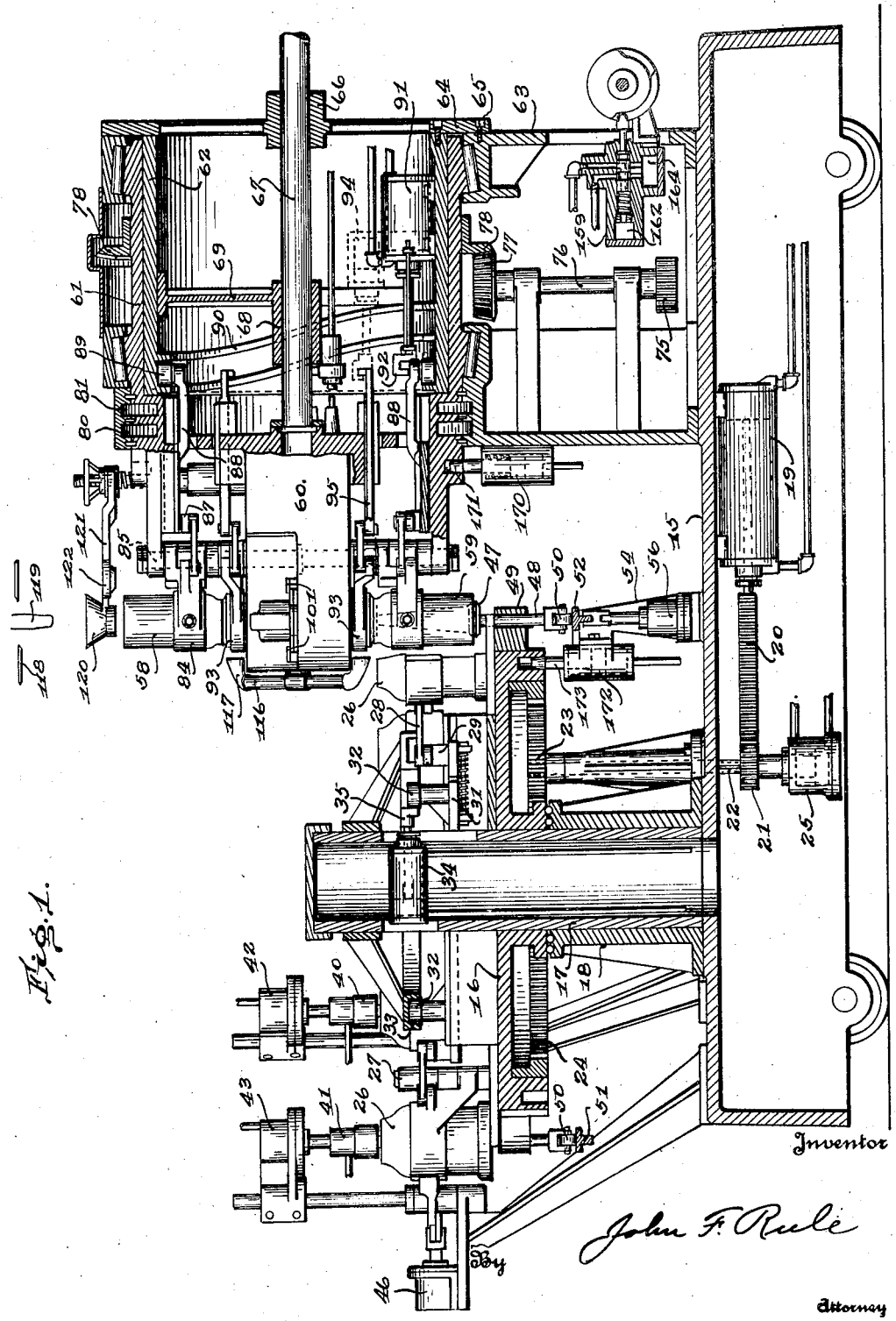
Fig. 1 is a sectional elevation of a machine constructed in accordance with my invention.

In general terms, the machine as herein illustrated comprises a finishing mold carriage rotated step by step about a vertical axis and having mounted thereon an annular series of partible finishing molds. Each step rotation brings a finishing mold to a parison transfer station. A pair of blank molds are mounted separately from the finishing mold carriage on a blank mold inverting head which is periodically rotated about a horizontal axis through an angle of 180 degrees. Each rotation of the inverting head swings one of the blank molds upward from the parison transfer station to an inverted position at the charge receiving station. At the same time the other blank mold is carried downward from the charge receiving station, with a charge of glass therein, to the transfer station. While the finishing mold carriage and blank mold inverting head are stationary, a parison of glass is transferred to the finishing mold at the transfer station. The transfer operation comprises opening the blank mold so that the parison is left suspended from the neck mold, then closing the finishing mold around the parison and opening the neck mold to complete the transfer. The movements of all parts of the machine, except the timer, are intermittent in character and are effected by air operated piston motors under the control of a continuously driven timer, all as more fully hereinafter set forth.

Referring to the drawings, the machine is mounted on a wheeled base or platform 15. A finishing mold carriage, comprising a table 16, is mounted for horizontal rotation about the axis of a stationary hollow shaft or column 17 rising from the base 15. The table 16 is supported on a cylindrical standard 18 which surrounds the column 17.

In the particular embodiment of the invention herein illustrated, intermittent or step by step rotation is imparted to the mold carriage by means of an air driven piston motor 19. A rack 20 attached to the piston rod drives a pinion 21 splined on a vertical shaft 22. On the upper end of said shaft is a pinion 23 which meshes with an internal gear 24 on the mold carriage. The pinion 21 is periodically moved up and down, into and out of mesh with the rack 20 by means of an air motor 25 operating as hereinafter set forth.

Finishing molds 26 are arranged in an annular series and mounted on the mold carriage for rotation therewith. Each said mold comprises partible sections carried on mold arms mounted to swing on a vertical pivot pin 27 fixed to the mold table. Links 28 connect the mold arms to a slide block 29 mounted to reciprocate radially of the mold carriage in a guideway 30. A second slide block 31 also mounted in the slideway 30 and yieldingly connected to the slide 29, carries a cam roll 32 which runs in a stationary cam groove or track 33 supported on the column 17.

Each finishing mold is under the control of the cam track 33, except while the mold is at the transfer station A. The mold carriage rotates in a counter-clockwise direction (Fig. 2) and when a mold reaches the transfer station the corresponding roll 32 is released from the cam, permitting the mold to be opened by a piston motor 34 mounted within the column 17. The piston rod of the motor carries a head 35 which, when a mold is at the transfer station, is behind the cam roll 32 so that when the motor is actuated said head operates through the connections above described to close the finishing mold about a parison, as hereinafter more fully set forth.

The outward movement of the roll 32 brings it into position to enter the cam track 33 when the mold carriage is again rotated. The cam track 33 is so shaped that it holds the mold closed until after the finish blowing and cooling and then opens the mold for the discharge of the finished article, holding it open until the transfer position is again reached. The step rotations of the finishing mold carriage bring each finishing mold to the stations designated A, B, C, D, E and F in succession.

Blowing heads 40 and 41 are located at the stations C and D, respectively. These heads are lowered to operative position by means of air motors 42 and 43, respectively. The blowing heads may be of usual construction, each including a valve which is opened automatically when the head engages the finishing mold therebeneath, or the parison, thereby admitting air under pressure for blowing the parison within the mold. Mold locking devices 44 which may be of usual construction are provided at the blowing stations C and D, and are operated respectively by air motors 45 and 46.

A bottom plate 47 is provided for each finishing mold, said plate having a vertical stem 48 extending downward through a bearing lug 49 on the mold table, said stem carrying a roll 50 at its lower end. While the mold is closed, the bottom plate 47 is held in position by the mold sections. While the mold is at the blowing stations C and D, the roll 50 is supported on a track 51, thus providing a support for the mold bottom while the parison is being blown. When the finishing mold opens, the mold bottom is permitted to drop a short distance. As the mold approaches the transfer position, the roll 50 runs onto a horizontally disposed arm or track 52 (Figs. 1 and 6). This arm is connected by a pivot 53 to a stationary bracket 54. The outer end of the arm has a link connection 55 with the piston of an air motor 56 which operates to lift the bottom plate 47 for a purpose hereinafter set forth.

The parison molds and their operating mechanism will now be described. These include a pair of blank molds 58 and 59 mounted on opposite sides of a blank mold inverting head 60 which is intermittently rotated about a horizontal axis, each rotation being through an angle of 180 degrees. The head 60 is carried by a drum 61 mounted to rotate on a stationary cylindrical shell or drum 62. As shown, the head 60 is formed integral with the head of the rotating drum 61. A framework 63 mounted on the platform 15 provides a support for the stationary drum 62. A spider 64 is connected by bolts 65 (Fig. 1) to the frame 63 and drum 62, said spider having a central bearing sleeve 66 through which extends a stationary horizontal tubular shaft 67, the inner end of which has a bearing in the head 60. The shaft 67 also extends through a bearing sleeve 68 on a spider 69 within the drum 62.

The drum 61 is rotated intermittently by an air motor 70 (Fig. 2) to the piston of which is connected a rack bar 71 (see also Fig. 9) which drives a pinion 72 splined on a shaft 73 on which is a gear 74 in mesh with a pinion 75 on the lower end of a shaft 76. On the upper end of the shaft 76 (Fig. 1) is a gear 77 which meshes with a ring gear 78 on the drum 61. A piston motor 79 (Fig. 9) operates to move the pinion 72 downward out of engagement with the rack 71 to permit the return movement of the latter after it has operated to invert the head 60.

Annular chambers 80 and 81 are formed in the inner end of the rotating drum 61 and the stationary casing surrounding said drum. The chamber 80 is connected as by means of a pipe 82 (Fig. 2) with means for maintaining a partial vacuum therein, and the chamber 81 is connected through a pipe 83 with a source of air pressure supply.

The two blank molds and their operating mechanisms may be identical. The two halves of each blank mold are carried on a pair of arms 84 (Fig. 1) fulcrumed on a pivot rod 85 on the head 60. Links 86 connect the mold arms to a head 87 mounted to reciprocate horizontally in a direction parallel with the axis of the head 60. Extending from the head 87 is an arm 88, the outer end of which carries a cam roll 89 which runs in a cam track 90 formed on the inner face of the stationary drum 62. The portion of the cam 90 which lies on one side of the axis of the drum is downwardly and inwardly inclined, being so shaped that it operates through the connections just described to close the blank mold 58 during its upward travel from the transfer station A to the charging station. The opposite portion 90ᵃ of the cam track 90 is parallel with the end of the drum, or, in other words, lies in a vertical plane perpendicular to the axis of the drum, and thus serves as a guide for the roll 89 and holds the blank mold closed during its downward movement from the charging position to the transfer station. As the mold swings into the transfer position an operating connection is effected between the mold and a piston motor 91 mounted within the drum 62. This connection comprises a hook 92 on the piston rod 91ᵃ (Fig. 3) of the motor and which engages a lug on the arm 88. An arm 91ᵇ on the piston rod has a sliding connection with a stationary guide rod 91ᶜ and prevents rotative movement of the piston rod.

Associated with each blank mold is a neck mold 93 carried on neck mold arms which are pivoted on the rod 85. The neck mold may be closed in the usual manner by the closing movement of the blank mold. The opening of the neck mold is effected by an air motor 94 (Fig. 1) within the drum 62, the motor being operatively connected with the neck mold through a slide rod 95 when the neck mold is in the transfer position.

Each body blank mold and associated neck mold together form a parison mold. Associated with each parison mold is a plunger 97 (see Fig. 4)

which projects into the neck mold and cooperates therewith in the usual manner for forming an initial blow opening in the parison. The plunger is operated by an air motor comprising a cylinder 98 and a piston 99 to which the plunger 97 is connected. The motor and plunger are removably mounted as a unit on the head 60. The lower end of the motor casing fits within a bearing sleeve 100 in the head 60. Lugs 101 engage over a flange portion of the motor casing for removably holding it in position.

The plunger is projected into the neck mold by air under pressure supplied to the cylinder above the piston and is withdrawn by exhausting the air from said cylinder. An air and vacuum line leading from the cylinder is opened alternately to the air pressure chamber 81 and the vacuum chamber 80 as will presently appear. This air pressure and vacuum line includes a channel 103 (Fig. 4) extending from the motor cylinder to a passageway 104 (see Fig. 3) extending through the head 60, and a pipe 105 leading to a head or a manifold 106 (Fig. 8). The manifold is connected to an air pressure valve 107 and a suction valve 108. A pipe 109 leads from the valve 107 to the pressure chamber 81 and a pipe 110 leads from the suction valve to the vacuum chamber 80. The pressure valve 107 (see Fig. 8A) is normally held open by a spring 111. The suction valve (Fig. 8B) is normally held closed by a spring 112. It will be seen that with the valves in the positions just described, air pressure is supplied to the plunger motor so that the plunger is held in its projected position (Fig. 4). For withdrawing the plunger the air is exhausted from the motor cylinder 98. This is effected by closing the pressure valve 107 and opening the suction valve 108, such operation of the valves being effected simultaneously by an air motor 113 (Fig. 3). When air is supplied to the motor 113, a disk 114 on the plunger piston is projected outwardly against the valve stems, thereby closing the valve 107 and opening the valve 108, thus connecting the cylinder of the plunger motor with the vacuum chamber 80. The motor 113 has a stationary mounting within the drum 62 in position to actuate the valves while the parison mold is at the transfer station and is timed to cause withdrawal of the plunger prior to the transfer of the parison, as more fully set forth hereinafter.

Air for cooling the neck molds and plungers is supplied from any suitable source through an air line including the pipe 67. Said pipe opens into a passageway 115 extending through the inverting head 60 and opening into a diagonal pipe 116 at the outer end of said head, said pipe having nozzles 117 in front of the neck molds. The cooling air from the nozzles is directed against the neck molds while the latter are closed. When the neck molds are opened the nozzles direct the blasts of air against the plungers.

Charges of glass may be supplied to the blank molds by an automatic feeder including a pair of shears 118 (Fig. 1) which sever the gobs of glass 119, permitting them to drop through a funnel guide 120 into the inverted blank mold 58 directly therebeneath. The guide 120 is carried on an arm 121 which also carries a mold closing plate 122. The arm 121 is mounted on a rock shaft 123 (Figs. 6 and 7) mounted for rocking movement and up and down movement within a standard 124. The movements of the rock shaft are effected by an air motor comprising a cylinder 125 and a piston 126, the latter connected to the rock shaft. A pin or roller 127 attached to the rock shaft runs in a cam groove 128 formed in the standard 124. A coil spring 129 holds the rock arm 121 in its elevated position in which the funnel guide 120 is in operative position over the mold. When air is supplied through a pipe 130 (Fig. 7) to the cylinder 125, the piston 126 is lowered. This moves the arm 121 downward and under the guidance of the cam the arm is rocked to bring the mold closing plate 122 over the mold and downward into position to close the mold, permitting the usual blowing of the parison therein by air pressure supplied through the neck mold.

When a charge of glass is dropped into the blank mold, suction is applied through the neck mold cavity for the usual purpose of causing the glass to properly fill the neck mold. The suction is applied through the chamber 132 between the neck mold and the motor cylinder 98. Ports 133 open from said chamber to a channel 134 leading to a suction valve 135 between said channel and a channel 136 which leads to the vacuum chamber 80. The valve 135 is normally held closed by a coil spring mounted on the valve stem 137. The valve is opened by means of an air motor 138 comprising a reciprocating piston carrying at its outer end a head 139, which, when the piston is projected, engages the stem 137 and opens the valve. This connects the vacuum chamber 80 with the chamber 132 for exhausting the air from the mold cavity.

Air pressure is applied to the chamber 132 after the plunger has been withdrawn, for effecting the initial blowing of the glass in the parison mold. The air pressure line extends from said chamber through a port 140 and channel 141 (see Fig. 5) to an air pressure valve 144. An air passageway 145 extends from the valve chamber to the pressure chamber 81. The valve 144 is held closed by the air pressure thereon supplemented by a valve closing spring 146 mounted on the valve stem 147. The valve is opened by an air motor 148 comprising a piston carrying a head 149, which, when air is applied through a pipe 150 to the motor, engages the valve stem and opens the valve. This establishes an air pressure line from the pressure chamber 81 to the chamber 132 and through the neck mold after the neck mold plunger has been withdrawn so that the glass is blown in the blank mold.

Air for cooling the plunger cylinders 98 may be supplied from the channel 115 through ports 115ª (Fig. 4) to cooling chamber 115ᵇ surrounding the motor cylinder. The air may be exhausted through a port 115ᶜ.

The timer mechanism (see Figs. 10 to 13) includes a series of cams designated by the numerals 1 to 14, inclusive, and a series of valves individual to and actuated by said cams. The cams are mounted on a shaft 155 for rotation therewith. A motor 156 operating through a train of gearing 157 rotates the shaft 155 and cams continuously. The cam shaft is mounted in arms 158 attached to a valve box 159. Certain of the valves are constructed to control the supply of air pressure through two lines and may be referred to as double valves. Other of the valves are single, controlling the supply of air to a single line. Fig. 12 shows in section a single valve controlled by the cam 13. The valve stem 160 carries a cam roll running on the cam 13. As the cam 13 rotates, it moves the valve to the left, thereby establishing communication between the air pressure chamber 162 and a pipe 163. When the cam roll runs off the high portion of the cam, a spring 161 moves the valve to the right as shown in Fig. 12, thereby connecting the pipe 163 with an exhaust chamber 164. The pressure chamber 162 and exhaust chamber 164 extend lengthwise of the valve box 159 and are common to all the valves therein. Air under pressure is supplied from any suitable source through a pipe 165 to the pressure chamber 162.

Fig. 13 illustrates the construction of a double valve actuated by the cam 10. When the valve is moved to the left by the cam, as shown, the pressure chamber is in communication through the valve with a pipe 166. At the same time a pipe 167 is in communication with the exhaust chamber 164. When the cam roll runs off the high portion of the cam the spring 161 reverses the valve, thereby connecting the pipe 167 with the pressure chamber and connecting the pipe 166 with the exhaust chamber.

The timer cams (Figs. 11 and 14) operating through their respective valves control the operations of the various air motors heretofore described, as follows:

The cam 1 operates through its valve to control the air supply to the motor 70 (Fig. 2) by which the blank mold turnover head 60 is inverted.

The cam 2 controls the air motor 19 (Fig. 1) by which the finishing mold table is indexed. The cam 3 controls the motor 25 (Fig. 1) which makes and breaks the gear train through which the motor 19 operates to index the mold carriage. The cam 3 also controls the motor 79 (Fig. 9) which makes and breaks the gear train through which the motor 70 operates the blank mold turnover head 60.

The cam 4 controls a motor 170 (Fig. 1) which operates to periodically project a locking pin 171 into position to lock the turnover head 60. The cam 4 also controls a piston motor 172 which operates periodically to project a locking pin 173 into locking engagement with the finishing mold table 16.

The cam 5 controls the motors 42 and 43 (Figs. 1 and 2) which operate the blowing heads 40 and 41, respectively. The cam 5 also controls the motors 45 and 46 which operate the mold locks 44.

The cam 6 controls the motor 34 (Fig. 1) which operates to close the finishing molds at the transfer station.

The cam 7 controls the air motors for actuating a take-out device 175 (Fig. 2) by which the blown articles are taken from the open finishing molds and transferred to a conveyor 176. This take-out mechanism may be conventional or of any approved construction.

The cam 8 controls the motor 56 (Figs. 1 and 6) which operates to lift the mold bottom plate.

The cam 9 controls the motor 91 (Fig. 1) by which the blank mold is opened while at the transfer station.

The cam 10 controls the motor 94 (Fig. 1) by which the neck mold is opened while at the transfer station.

The cam 11 controls the motor 148 (Fig. 3) which actuates the valve 144 for supplying air pressure to the parison mold and blowing the parison therein.

The cam 12 controls the air motor 138 (Fig. 3) which actuates the valve 135 for applying suction to the neck mold during the formation of the parison neck.

The cam 13 controls the air motor 113 (Fig. 3) which actuates the valves 107 and 108 by which the movements of the plunger 97 are controlled.

The cam 14 controls the motor (Fig. 7) by which the compression plate 122 and funnel guide 120 are actuated.

*Operation*

The operation may be summarized as follows: Assuming that the finishing mold table has just completed an indexing movement and the blank mold turnover has just completed an inverting movement by which the blank mold 59 is brought to the transfer position, as shown in Fig. 1, a parison is at this time enclosed within the blank mold 59 at the transfer station and the funnel guide 120 is in position to guide a charge of glass into the inverted blank mold 58. The blank mold turnover and the finishing mold table are locked by the operation of the air motors 170 and 172, respectively, under the control of the timer cam 4. The blow heads 40 and 41 at the stations C and D are moved downward to operative position by the motors 42 and 43 under the control of the timer cam 5. At the same time the locks 44 are actuated by their motors 45 and 46 also under the control of the cam 5. The positioning of the blowing heads on the molds automatically opens them to air pressure so that the blowing of the parisons is effected in the finishing molds at stations C and D. The blowing heads are withdrawn and the locks 44 released, preferably just before the next indexing movement of the mold table. Transfer of the parison to the finishing mold takes place while the mold table is at rest. The transfer operations include the operation of the motor 91 under the control of the timer cam 9 to open the body blank mold 59, the operation of the motor 34 under the control of the timer cam 6 to close the finishing mold 26 about the parison, the operation of the motor 113 under the control of the cam 13 to cause the plunger 97 to be withdrawn from the neck mold, and the operation of the motor 94 under the control of the timer cam 10 to open the neck mold 93, thereby completing the transfer.

While the parison transfer is taking place, a charge of glass 119 is introduced into the blank mold 58 and the parison forming operations are effected. Such operations include: First, the application of suction to the blank mold. This is effected by the motor 138 operating under the control of the timer cam 12 to open the suction valve 135. Second, the compression plate 122 is lowered by the motor 125, 126 under the control of the timer cam 114. Third, the motor 148 operates under the control of the timer cam 11 to open the pressure valve 144 and thereby supply air under pressure for blowing the parison within the blank mold.

The take-out mechanism 175 may operate at any time while the finishing mold table is stationary, under the control of the timer cam 7.

After the above operations have been completed, the finishing mold table is indexed under the control of the cam 2 and the blank mold turnover is indexed under the control of cam 1, thereby completing a cycle of operations. It will be understood that before such indexing commences the blowing heads 40 and 41 are lifted, the mold locks 44 are released and the locking pins for the turnover and finishing mold table are withdrawn, all under the control of their respective timer cams. The indexing movement of the finishing mold table commences shortly before the movement of the blank mold turnover head 60 so that the finishing mold with the parison therein at the transfer station is carried to a position in which it will not interfere with the neck mold during the initial inverting movement of the turnover head 60. When the indexing movements of said head and the mold table are completed, the motor 25 (Fig. 1) and the motor 79 (Fig. 9) operate under the control of the timer cam 3 to break the gear trains and permit the return movements of the motor pistons.

Modifications may be resorted to within the spirit and scope of my invention.

What I claim is:

1. A machine for forming hollow glass articles, comprising a pair of parison molds, means for supporting one of said molds at a charge receiving position while the other mold is at a parison transfer station, a series of finishing molds, means for moving the finishing molds in succession to the transfer station, means for transposing said parison molds each time a finishing mold is brought to said transfer station, means for transferring parisons from the parison molds to each of the finishing molds in succession at the transfer station, and means for introducing charges of molten glass into the parison molds at the charge receiving station, said parison transfer means comprising mechanism for enclosing the parison in the finishing mold and thereafter releasing the parison to the finishing mold.

2. In a machine for forming hollow glass articles, the combination of a finishing mold carriage, finishing molds thereon, means for actuating said carriage and thereby bringing the finishing molds in succession to a transfer station, a pair of blank molds mounted separately from said carriage, means for bringing the blank molds alternately to the transfer station and for bringing the blank molds alternately to the same charging station, each blank mold being at said charging station while the other blank mold is at said transfer station, means for transferring parisons from the blank molds to the finishing molds, one said parison being transferred to each finishing mold as the latter reaches said transfer station, and means for introducing charges of glass into each blank mold while at said charging station and while the other blank mold is at the transfer station, said parison transfer means comprising mechanism for opening the blank mold and suspending a bare parison, closing the finishing mold around the parison and thereafter releasing the parison from said suspension.

3. In a machine for forming hollow glass articles, the combination of a finishing mold carriage, finishing molds thereon, means for actuating said carriage and thereby bringing the finishing molds in succession to a transfer station, a blank mold inverting head, a pair of blank molds supported thereon and projecting in opposite directions, means for rotating said head step-by-step about a horizontal axis and thereby moving a blank mold to the transfer station and simultaneously inverting the other blank mold and bringing it to a charge receiving station, each said step rotation being through an angle of 180 degrees, means for holding parisons stationary at the transfer station, and means for transferring the parisons from the blank molds to the finishing molds while held stationary at the transfer station.

4. The combination of a finishing mold carriage, finishing molds thereon, means for intermittently rotating the carriage about a vertical axis and thereby bringing said molds in succession to a parison transfer station, a pair of parison molds, a support on which the parison molds are mounted, one of said parison molds extending upwardly in an inverted position at a charging station for receiving a charge of glass, the other parison mold extending downwardly in an upright position at the transfer station, means for intermittently rotating said support and reversing the positions of the parison molds during each rotation, whereby they are each moved alternately from the charge receiving station to the transfer station, means for introducing charges of glass into the parison molds at said charging station, and means for transferring parisons from the parison molds to the finishing molds at said transfer station while said carriage and parison support are held stationary, said transfer means including mechanism for opening a parison mold and suspending a bare parison, mechanism for closing a finishing mold about the parison, and means for retaining the parison, during the closing of the finishing mold, in its position of rest to which it was brought prior to the opening of the parison mold.

5. The combination of a finishing mold carriage, finishing molds thereon, means for rotating the carriage about a vertical axis and thereby bringing said molds in succession to a parison transfer station, a pair of parison molds, a support on which the parison molds are mounted, one of said parison molds extending upwardly in an inverted position at a charging station for receiving a charge of glass, while the other parison mold extends downwardly in an upright position at the transfer station, means for rotating said support and reversing the positions of the parison molds, whereby they are each moved alternately from the charge receiving station to the transfer station, automatic means for introducing charges of molten glass into the parison molds at the charging station and forming them into parisons, and automatic means for transferring a parison to each finishing mold as the finishing mold reaches the transfer station and concurrently with the introduction and formation of a parison in the parison mold at the charging station, said parison transfer means comprising mechanism for enclosing the parison in the finishing mold and thereafter releasing the parison to the finishing mold.

6. In a machine for forming hollow glass articles, the combination of a finishing mold carriage, an annular series of finishing molds thereon, means for rotating the carriage step by step about a vertical axis and thereby bringing the molds in succession to a parison transfer station, a pair of parison molds, a support on which the parison molds are mounted, said support having a stationary mounting at one side of the mold carriage, means for periodically imparting step rotations to said support about a horizontal axis through angles of 180 degrees each, each parison mold being moved from a charge receiving position to the transfer station during one step rotation of the said support and moved from the transfer station to the charge receiving position during the next succeeding step rotation of said support, means for introducing charges of molten glass into the parison molds while at said receiving position, and means for transferring parisons from the parison molds to the finishing mold at the transfer station while said carriage and parison support are held stationary, said transfer means including mechanism for opening a parison mold and suspending a bare parison, and mechanism for closing a finishing mold about the parison while the latter is retained in its position of rest to which it was brought prior to the opening of the parison mold.

7. In a machine for forming hollow glass articles, the combination of a pair of parison molds, an inverting head on which the molds are mounted, and means for rotating said head about a horizontal axis and thereby moving each mold alternately from a charge receiving position to a transfer station, said molds having their axes parallel and offset laterally on opposite sides of said axis of rotation.

8. In a machine for forming hollow glass articles, the combination of a pair of parison molds, an inverting head on which the molds are mounted, means for rotating said head about a horizontal axis and thereby moving each mold alternately from a charge receiving position to a transfer station, said molds having their axes parallel and offset laterally on opposite sides of said axis of rotation, a finishing mold carriage, finishing molds thereon, means for rotating the carriage and thereby bringing the finishing molds in succession to the transfer station in synchronism with the movements of the parison molds to said station, and means for transferring parisons from the parison molds to the finishing molds at said station.

9. In a machine for forming hollow glass articles, the combination of a finishing mold carriage, an annular series of finishing molds thereon, means for rotating said carriage step by step and thereby bringing the finishing molds in succession to a transfer station, a parison mold inverting head, a pair of parison molds mounted on opposite sides of said head, means for periodically rotating said head step by step through angles of 180 degrees each and thereby swinging a parison mold from a charge receiving position downward to the transfer station during each step rotation and at the same time swinging the other parison mold from the transfer station upward to the charge receiving position, means for transferring a parison from a parison mold to a finishing mold at the transfer station while the mold carriage and inverting head are at rest, said transfer means including mechanism for opening the parison mold and suspending the parison, means for closing the finishing mold about the suspended parison, means for supporting the parison in a fixed position throughout said transfer operation, and means for introducing a charge of glass into the parison mold at rest at the charging station.

10. In a machine for forming glass articles, the combination of an inverting head, a stationary drum on which said head is supported, means for rotating said head step by step about the horizontal axis of said drum, a mold mounted on said head, a stationary cam within the drum, mechanism for opening and closing the mold, said mechanism having an operating connection with said cam whereby the mechanism is actuated during the rotation of said head, and means for actuating said mechanism while said head is at rest.

11. In a machine for forming glass articles, the combination of an inverting head, a stationary drum on which said head is supported, means for rotating said head step by step about the horizontal axis of said drum, a mold mounted on said head, a stationary cam within the drum, mechanism for opening and closing the mold, said mechanism having an operating connection with said cam whereby the mechanism is actuated during the rotation of said head, an air motor mounted within the drum, and means providing an operating connection between said motor and said mechanism while the inverting head is at rest.

12. In a machine for forming glass articles, the combination of a mold inverting head, a mold mounted thereon, a stationary drum on which said head is supported, automatic means for periodically rotating said head step by step about the horizontal axis of the drum through angles of 180 degrees each and thereby moving the mold from an upwardly projecting inverted position at a charging station to a downwardly projecting non-inverted position at a transfer station during one step rotation and returning the mold to said position at the charging station during the next succeeding step rotation of said head, a stationary cam within the drum, mechanism for opening and closing the mold, operating connections between said mechanism and cam by which the mold is closed during its upward movement from the transfer station to the charge receiving station and held closed during its downward movement from the charge receiving station to the transfer station, and means independent of the cam for opening the mold while at the transfer station.

13. In a machine for forming glass articles, the combination of a mold inverting head, a mold mounted thereon, a stationary drum on which said head is supported, automatic means for periodically rotating said head step by step about the horizontal axis of the drum through angles of 180 degrees each and thereby moving the mold from an upwardly projecting inverted position at a charging station to a downwardly projecting non-inverted position at a transfer station during one step rotation and returning the mold to said position at the charging station during the next succeeding step rotation of said head, a stationary cam within the drum, mechanism for opening and closing the mold, operating connections between said mechanism and cam by which the mold is closed during its upward movement from the transfer station to the charge receiving station and held closed during its downward movement from the charge receiving station to the transfer station, an air motor mounted within the drum, and means operated by said motor to actuate said mechanism and thereby open the mold while the inverting head is at rest with the mold at the transfer station.

14. In a machine for forming glass articles, the combination of a mold inverting head, a mold mounted thereon, a stationary drum on which said head is supported, automatic means for periodically rotating said head step by step about the horizontal axis of the drum through angles of 180 degrees each and thereby moving the mold from an upwardly projecting inverted position at a charging station to a downwardly projecting non-inverted position at a transfer station during one step rotation and returning the mold to said position at the charging station during the next succeeding step rotation of said head, a stationary cam within the drum, mechanism for opening and closing the mold, operating connections between said mechanism and cam by which the mold is closed during its upward movement from the transfer station to the charge receiving station and held closed during its downward movement from the charge receiving station to the transfer station, means providing air pressure and vacuum lines extending to the mold, valves in said head controlling said lines, air motors mounted in said drum, and means for establishing operating connections between said valves and said air motors while the inverting head is at rest.

15. A machine for forming hollow glass articles comprising a pair of parison molds, means for supporting one of said molds at a charge receiving position while the other mold is at a parison transfer station, a finishing mold carriage, a series of finishing molds thereon greater in number than the parison molds, means for rotating said carriage and bringing the finishing molds in succession to the transfer station, means for transposing said parison molds each time a finishing mold is brought to said transfer station, means for transferring parisons from the parison molds to each of the finishing molds in succession at the transfer station, and means for introducing charges of molten glass into the parison molds while at said charge receiving position, said parison transfer means comprising mechanism for enclosing the parison in the finishing mold and thereafter releasing the parison to the finishing mold.

16. A machine for forming glass articles comprising, in combination, a parison mold, means for forming a parison therein, a finishing mold, means for rotating one said mold horizontally in a circular path, means for rotating the other said mold vertically in a circular path tangent to said first mentioned path, means for opening the parison mold, means for supporting the bare parison at the point of tangency of said paths, and means for closing the finishing mold about said parison while the latter is at said point of tangency.

17. The combination of a parison mold, means for rotating it about a horizontal axis, a finishing mold having its axis vertically disposed, means for rotating it about a vertical axis, the paths of the mold axes being tangent at one point, means for opening the parison mold and suspending a bare parison at said point of tangency, and means for closing the finishing mold about the parison while the latter is at said point of tangency.

18. The combination of a finishing mold, means for rotating it intermittently about a vertical axis while the mold is held with its axis vertical, a parison mold, means for rotating it intermittently about a horizontal axis, the path of the parison mold axis being tangent to the path of the finishing mold axis at a transfer station, means for opening the parison mold and supporting a bare parison at said station, and means for closing the finishing mold about the parison while the latter is held stationary at said station.

19. The combination of a finishing mold, means for rotating it intermittently about a vertical axis while the mold is held with its axis vertical, a parison mold, means for rotating it intermittently about a horizontal axis, the path of the parison mold axis being tangent to the path of the finishing mold axis at a transfer station, said parison mold comprising a neck mold and a body blank mold in register therewith, the parison mold being in upright position when at said transfer station, means for opening the body blank mold and leaving a bare parison held stationary by the neck mold at the transfer station, means for closing the finishing mold about the suspended parison, and means for opening the neck mold and thereby completing the transfer of the parison, the latter being held stationary at the transfer station during said opening of the blank mold and neck mold and closing of the finishing mold.

20. The combination of a finishing mold carriage, an annular series of finishing molds thereon with their axes vertical, means for rotating said carriage about a vertical axis, a pair of parison molds, a support on which the parison molds are mounted, said parison molds being disposed on opposite sides of said support and projecting therefrom in opposite directions, means for rotating said support about a horizontal axis and thereby swinging each parison mold from a charge receiving position to a transfer position in which the axis of the parison mold is vertically disposed and tangent to the path of the finishing mold axes, and means for transferring a parison from a parison mold to a finishing mold including means for opening the parison mold, leaving a parison bare and closing a finishing mold about the parison while the latter is in the path of the finishing mold axes.

JOHN F. RULE.